(12) United States Patent
Cooley

(10) Patent No.: US 7,890,590 B1
(45) Date of Patent: Feb. 15, 2011

(54) VARIABLE BAYESIAN HANDICAPPING TO PROVIDE ADJUSTABLE ERROR TOLERANCE LEVEL

(75) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 707 days.

(21) Appl. No.: 11/863,007

(22) Filed: Sep. 27, 2007

(51) Int. Cl.
*G06F 15/16* (2006.01)

(52) U.S. Cl. .................... 709/206; 709/224; 706/20; 726/22

(58) Field of Classification Search ............... 709/206, 709/224; 726/22; 706/20
See application file for complete search history.

(56) References Cited

U.S. PATENT DOCUMENTS

| | | | |
|---|---|---|---|
| 5,222,236 A * | 6/1993 | Potash et al. ................. 715/210 |
| 7,089,241 B1 | 8/2006 | Alspector et al. |
| 7,577,709 B1 * | 8/2009 | Kolcz .......................... 709/206 |
| 7,647,321 B2 * | 1/2010 | Lund et al. ............ 707/E17.059 |
| 7,680,890 B1 * | 3/2010 | Lin .............................. 709/206 |
| 2002/0147782 A1 * | 10/2002 | Dimitrova et al. ........... 709/207 |
| 2005/0216564 A1 | 9/2005 | Myers et al. |
| 2006/0015563 A1 * | 1/2006 | Judge et al. ................. 709/206 |
| 2006/0026675 A1 * | 2/2006 | Cai et al. ...................... 726/22 |
| 2006/0149821 A1 * | 7/2006 | Rajan et al. ................. 709/206 |
| 2006/0168041 A1 * | 7/2006 | Mishra et al. ............... 709/206 |
| 2006/0184479 A1 * | 8/2006 | Levine ........................ 706/25 |
| 2007/0006028 A1 * | 1/2007 | Desouza et al. ............... 714/12 |
| 2007/0192490 A1 * | 8/2007 | Minhas ....................... 709/226 |
| 2007/0233787 A1 * | 10/2007 | Pagan .......................... 709/206 |
| 2008/0002870 A1 * | 1/2008 | Farag et al. ................. 382/128 |
| 2008/0010353 A1 * | 1/2008 | Rounthwaite et al. ....... 709/206 |
| 2008/0127339 A1 * | 5/2008 | Swain et al. .................. 726/22 |
| 2008/0201411 A1 * | 8/2008 | Paritosh ...................... 709/203 |
| 2009/0077617 A1 * | 3/2009 | Levow et al. .................... 726/1 |

OTHER PUBLICATIONS

Ii, Yang et al., "Research of a Novel Anti-Spam Technique Based on Userss Feedback and Improved Naive Bayesian Approach," Networking and service, 2006.*
Ji, Yuanfu et al., "Multi-level filters for a Web-based e-mail system," Information Reuse and Integration, 2004.*
Luo, Xiao et al. "Comparison of a SOM Based Sequence Analysis System and Naïve Bayesian Classifier for Spam Filtering," Proceedings of International Joint Conference on Neural Networks, 2005.*
Mo, et al.; "Multi-agent Interaction Based Collaborative P2P System for Fighting Spam"; Dec. 1, 2006; IEEE/WIC/ACM Int'l Conference on Intelligent Agent Technology; ISBN 978-07695-2748-2, pp. 428-431.

(Continued)

*Primary Examiner*—Oanh Duong
(74) *Attorney, Agent, or Firm*—Brill Law Office; Jeffrey Brill

(57) ABSTRACT

A Bayesian spam filter calculates multiple handicap values, each of which is mapped to a selectable error tolerance level. Users operate a user interface component such a slider to select a desired error tolerance level. The Bayesian spam filter utilizes the corresponding handicap value for its filtering operations. Thus, the users of the anti-spam program can adjust their error tolerance levels up and down as desired.

17 Claims, 3 Drawing Sheets

OTHER PUBLICATIONS

Chandra, et al.; "Ways to Evade Spam Filters and Machine Learning as a Potential Solution"; Oct. 1, 2006; IEEE Int'l Symposium on Communications and Information Technologies.

Carpinter, et al.; "Tightening the net: A review of current and next generation spam filtering tools"; Nov. 21, 2006; Computers & Security, vol. 25, No. 8, Elsevier Science Publishers, ISSN: 0167-4048, pp. 566-578.

European Search Report for Application No. EP08014069, 12 pages, dated Dec. 2, 2008.

* cited by examiner

VARIABLE BAYESIAN HANDICAPPING TO PROVIDE ADJUSTABLE ERROR TOLERANCE LEVEL

TECHNICAL FIELD

This invention pertains generally to Bayesian filtering of electronic content, and more specifically to providing selectable Bayesian handicapping to enable a user to adjust the error tolerance level during Bayesian spam filtering.

BACKGROUND ART

Spam classification engines analyze the content of email messages and attempt to determine which emails are spam based on various statistical techniques, such as Bayesian analysis. Bayesian spam filtering is based on established probabilities of specific words appearing in spam or legitimate email. For example, nonsense words, as well as certain words such as "Viagra", "Refinance", "Mortgage" etc, frequently appear in spam, and yet rarely or less frequently appear in legitimate email. Thus, the presence of such terms increases the probability of an email being spam. A Bayesian spam classification engine has no inherent knowledge of these probabilities, but instead establishes them by being trained on a set of email messages.

Unlike other statistical classification methods, predicting error rates (rates of false positives and false negatives during classification) for a Bayesian classifier is very difficult. Tuning a Bayesian engine to produce predicable error rates is even more difficult. When classifying email as spam or non-spam, individual users have varying tolerance levels for false positive and false negative rates. Existing Bayesian classifiers simply utilize a single, non-changeable value designed to please everybody. However, many users find that this value does not produce the results that they desire, and consequently would like to be able to adjust change the error rate.

It would be desirable to be able to allow users to adjust the error rate for a Bayesian classifier up and down as desired, thereby allowing users to customize the error rate to their personal tolerance level.

SUMMARY

A user is allowed to select from among multiple false positive/negative tolerance levels during Bayesian classification of email as spam or legitimate. A Bayesian spam filter calculates multiple handicap values, each of which is mapped to a selectable error tolerance level. The user can operate a user interface component such a slider to select a desired error tolerance level. The Bayesian spam filter utilizes the corresponding handicap value for its filtering operations. Thus, the users of the anti-spam program can adjust their error tolerance levels up and down as desired.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
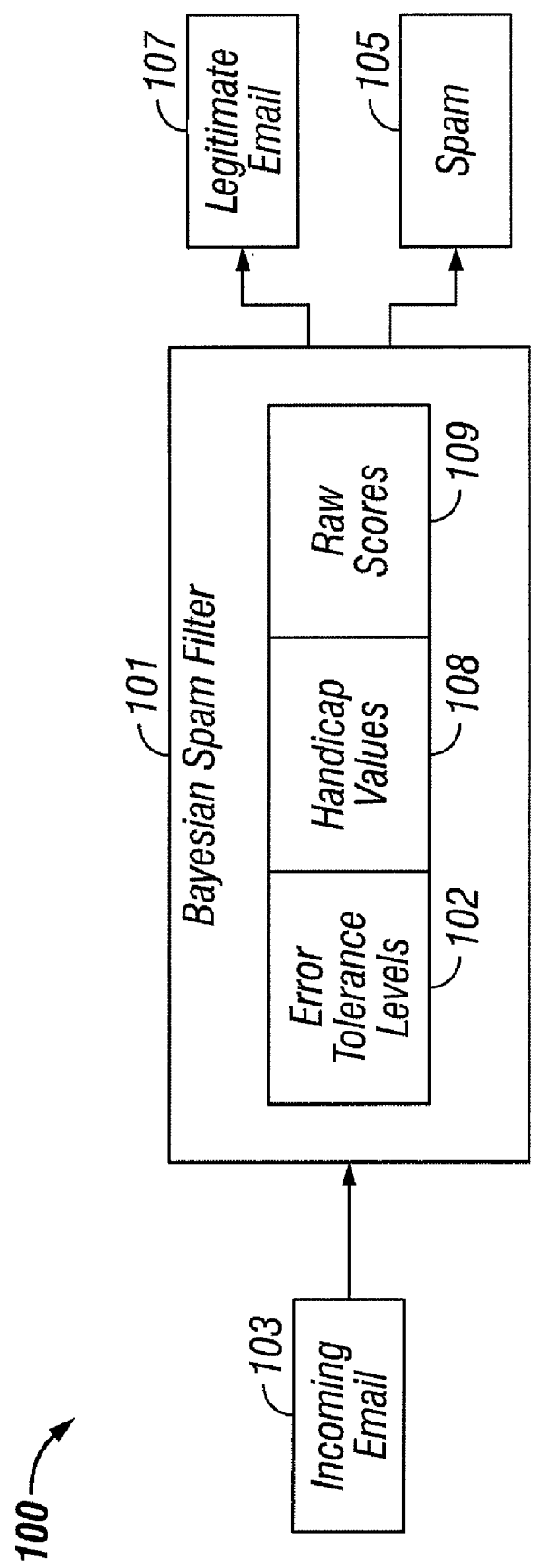
FIG. 1 is a block diagram illustrating a system in which a Bayesian spam filter calculates and utilizes multiple error tolerance levels, according to some embodiments of the present invention.

FIG. 1 illustrates a system 100 in which a Bayesian spam filter 101 calculates and utilizes multiple error tolerance levels 102, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a Bayesian spam filter 101 receives incoming email messages 103. The implementation mechanics of a standard Bayesian spam filter 101 are known to those of ordinary skill in the relevant art, and the usage thereof within the context of the present invention will be readily apparent to one of such a skill level in light of this specification. During the process of utilizing Bayesian methodology to review incoming emails 103, the Bayesian spam filter 101 analyzes the probability of each email 103 being spam 105 versus legitimate email 107.

Note that in Bayesian classification generally, when classifying a list of words (e.g., the words in an email 103), each category (e.g., spam 105 and legitimate email 107) is given a raw score 109 by calculating the sum of P(Category|Word) (that is, the probability that the document is of Category given the occurrence of Word) for each word in the document.

As illustrated in FIG. 1, above and beyond standard Bayesian processing, the Bayesian spam filter 101 calculates and utilizes multiple error tolerance levels 102. An error tolerance level 102 corresponds to a value 108 by which to adjust raw scores 109 calculated during the Bayesian filtering process. This adjustment value 108 can be thought of as a "handicap" value 108 (i.e., a value 108 by which to handicap the raw score 109). In one embodiment, raw scores 109 are adjusted based on a handicap value 108 corresponding to a currently selected error tolerance level 102 according to the formula in Table 1 below, wherein WC represents the number of words in the email 103 being analyzed, and Count represents the ordinal number of the word currently being analyzed:

TABLE 1

$$RawScore = \text{Handicap} + \sum_{i=1}^{WC} P(\text{Category} | Word_i) \cdot Count_i$$

Figure 2:
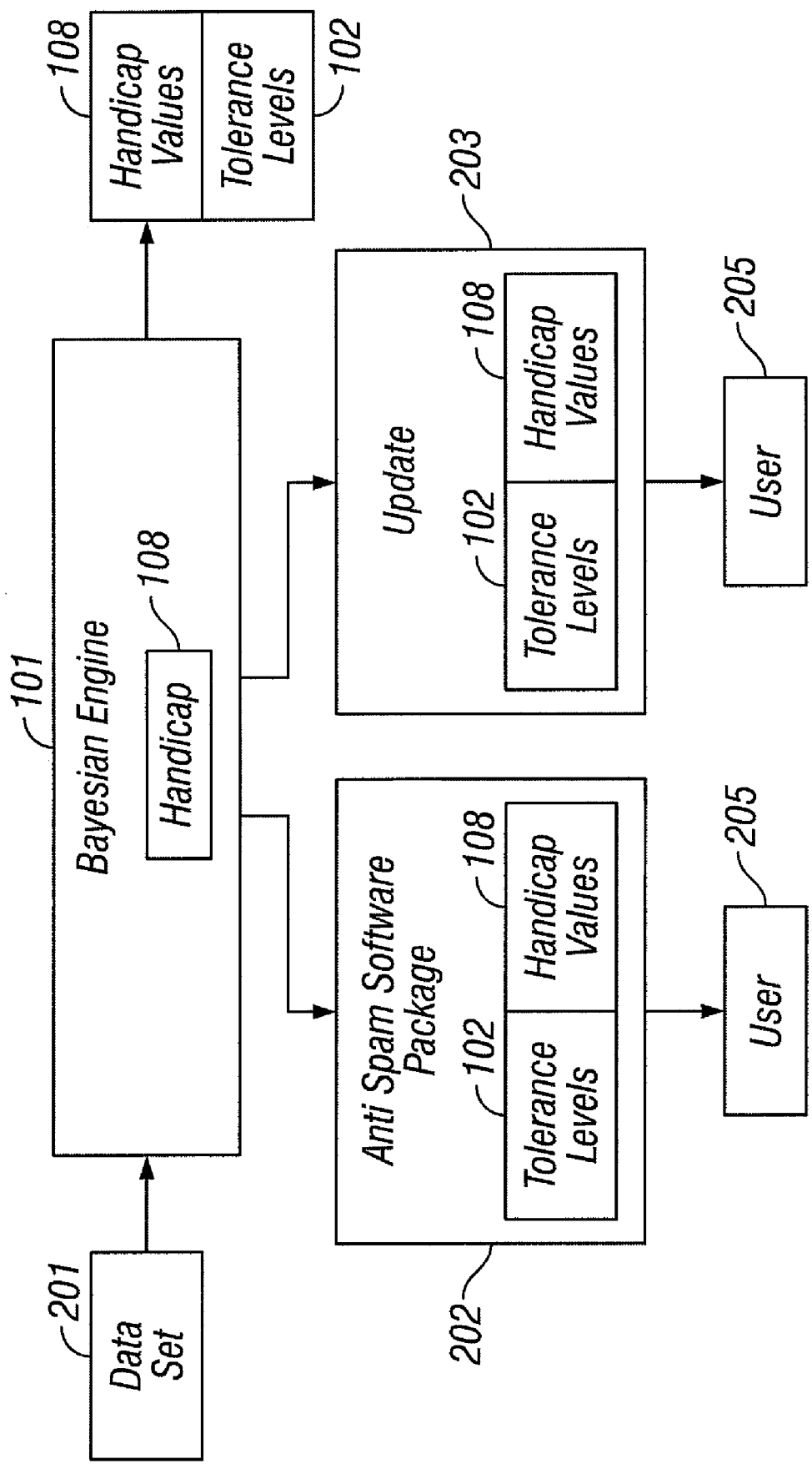
FIG. 2 is a block diagram illustrating a Bayesian engine calculating multiple handicap values and error tolerance levels, according to some embodiments of the present invention.

Turning now to FIG. 2, in order to calculate a plurality of handicap values 108, a trained Bayesian engine 101 processes a sufficiently large test sample set 201 of documents repeatedly. After each run of the Bayesian engine 101 on the sample set 201, the handicap value 108 is adjusted (up or down), until a desired number of values 108 have been identified (i.e., one per each desired error tolerance level 102). The handicap value 108 can be adjusted linearly per epoch, or in other ways, for example by employing a binary search to improve the speed of finding the desired handicap values 108. Of course, the number of handicap values 108 that are identified is a variable design parameter, that depends upon the number of possible error tolerance levels 102 to be provided to users 205. Once the desired number of handicap values 108 has been identified, each handicap value 108 is associated with a corresponding error tolerance level 102, to be provided to users 205 as a possible selection.

The calculated handicap values 108 and corresponding error tolerance levels 102 can be made available to users 205, for example by imbedding them in an anti-spam software product 202 or by imbedding them in an updated information set 203 (e.g., new spam definitions) to be distributed to users 205 of an anti-spam software product 202.

Figure 3:
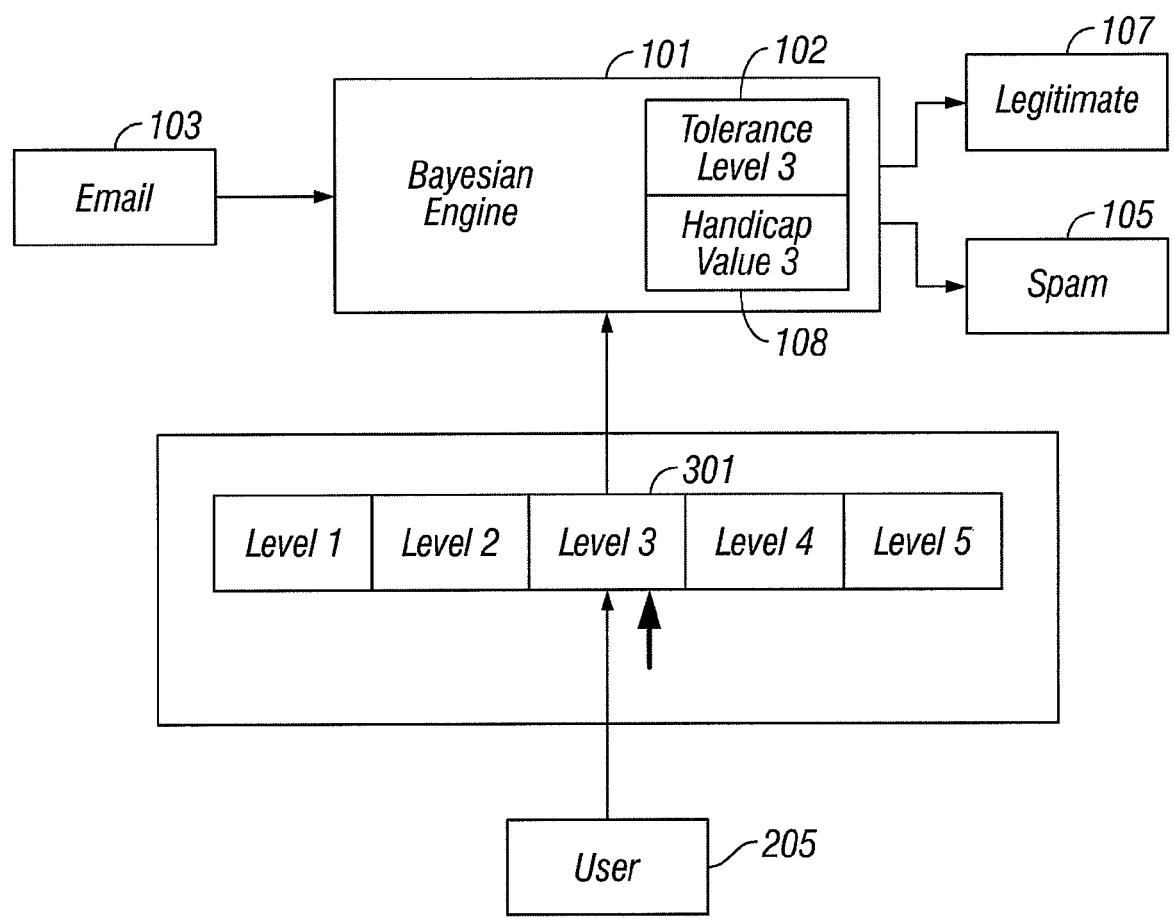
FIG. 3 is a block diagram illustrating a Bayesian engine providing a user with the option of choosing from among a selection of multiple error tolerance levels, according to some embodiments of the present invention.

Turning now to FIG. 3, these handicap values 108 are used by the engine 101 at runtime to classify email messages 103 according to the selected error level 102. In the embodiment illustrated in FIG. 3, five predefined error rate tolerance levels 102 are provided (as noted above, more or fewer tolerance levels can be provided as desired). FIG. 3 illustrates a slider control 301, which allows a user 205 to select the desired tolerance level 102 to use. Of course, other user interface components can be substituted for the slider 301, such as radio or other types of buttons, pull down or other types of menus, command line options, configuration file parameters, environment variables, etc. (not illustrated). In any case, when a user 205 selects a tolerance level 102 to use, the engine 101 then utilizes the corresponding handicap value 108 calculated as described above in conjunction with FIG. 2. It is to be further understood that a current tolerance level 102 can comprise a default or an automatically selected level 102 as desired.

It is to be further understood that although this specification has been discussing classifying email messages 103 as spam 105 or legitimate 107, the present invention is in no way so limited. Although spam classification is a great use for the present invention, it can be utilized within the context of the Bayesian classification of any document type into any number of appropriate categories.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for utilizing multiple error tolerance levels during Bayesian filtering, the method comprising the steps of:

providing, by at least one computer, a plurality of error tolerance levels having corresponding handicap values to at least one user of a Bayesian filtering context;

receiving, by the at least one computer, an error tolerance level selection from the at least one user;

adjusting, by the at least one computer, a Bayesian score in accordance with the handicap value corresponding to the selected error tolerance level during Bayesian filtering; and categorizing incoming e-mail messages using the adjusted Bayesian score.

2. The method of claim 1 wherein receiving, by the at least one computer, a selection of one of the plurality of error tolerance levels further comprises performing at least one step from a group of steps consisting of:

receiving, by the at least one computer, input from a user operating a user interface indicating a choice of a desired error tolerance level from among the plurality of error tolerance levels;

receiving, by the at least one computer, command line input indicating a choice of a desired error tolerance level from among the plurality of error tolerance levels;

reading, by the at least one computer, a parameter in a configuration file indicating a choice of a desired error tolerance level from among the plurality of error tolerance levels; and reading, by the at least one computer, an environment variable indicating a choice of a desired error tolerance level from among the plurality of error tolerance levels.

3. The method of claim 1 wherein providing, by the at least one computer, a plurality of error tolerance levels having corresponding handicap values further comprises performing at least one step from a group of steps consisting of:

embedding, by the at least one computer, the plurality of error tolerance levels and corresponding handicap values in a Bayesian filtering software package, and providing the Bayesian filtering software package to at least one user;

embedding, by the at least one computer, the plurality of error tolerance levels and corresponding handicap values in a software update, and providing the software update to at least one user; and displaying, by the at least one computer, a user interface component to at least one user that prompts the at least one user to select a desired error tolerance level from among the plurality of error tolerance levels.

4. The method of claim 1 further comprising:

calculating, by the at least one computer, the plurality of handicap values; and associating, by the at least one computer, each calculated handicap value with a corresponding error tolerance level.

5. The method of claim 4 wherein calculating, by the at least one computer, a plurality of handicap values further comprises:

utilizing, by the at least one computer, a handicap value in the performing of a Bayesian filtering operating on a data set;

determining, by the at least one computer, whether the utilized handicap value is a desired one to include in the plurality; and until a desired number of handicap values have been identified to include in the plurality, adjusting, by the at least one computer, the handicap value and repeating the utilizing and determining steps with the adjusted handicap value.

6. The method of claim 4 wherein associating, by the at least one computer, each calculated handicap value with a corresponding error tolerance level further comprises:

for each calculated handicap value of the plurality, associating, by the at least one computer, a corresponding user selectable error tolerance level, such that responsive to a user selecting that error tolerance level, the corresponding handicap value is utilized for Bayesian filtering.

7. The method of claim 1 wherein the Bayesian filtering by the at least one computer classifies the incoming email messages as belonging to a single category from a group of categories consisting of:

spam; and legitimate email.

8. At least one non-transitory computer readable medium storing a computer program product for utilizing multiple error tolerance levels during Bayesian filtering, the computer program product comprising:

program code for providing a plurality of error tolerance levels having corresponding handicap values to at least one user of a Bayesian filtering context;

program code for receiving an error tolerance level selection from the at least one user; and program code for adjusting a Bayesian score in accordance with the handicap value corresponding to the selected error tolerance level during Bayesian filtering; and program code for categorizing incoming e-mail messages using the adjusted Bayesian score.

9. The computer program product of claim 8 wherein the program code for receiving a selection of one of the plurality of error tolerance levels further comprises program code for performing at least one step from a group of steps consisting of:

receiving input from a user operating a user interface indicating a choice of a desired error tolerance level from among the plurality of error tolerance levels;

receiving command line input indicating a choice of a desired error tolerance level from among the plurality of error tolerance levels;

reading a parameter in a configuration file indicating a choice of a desired error tolerance level from among the plurality of error tolerance levels; and reading an environment variable indicating a choice of a desired error tolerance level from among the plurality of error tolerance levels.

10. The computer program product of claim 8 wherein the program code for providing a plurality of error tolerance levels having corresponding handicap values further comprises program code for performing at least one step from a group of steps consisting of:

embedding the plurality of error tolerance levels and corresponding handicap values in a Bayesian filtering software package, and providing the Bayesian filtering software package to at least one user;

embedding the plurality of error tolerance levels and corresponding handicap values in a software update, and providing the software update to at least one user; and displaying a user interface component to at least one user that prompts the at least one user to select a desired error tolerance level from among the plurality of error tolerance levels.

11. The computer program product of claim 8 further comprising:

program code for calculating the plurality of handicap values; and program code for associating each calculated handicap value with a corresponding error tolerance level.

12. The computer program product of claim 11 wherein the program code for calculating a plurality of handicap values further comprises program code for:

utilizing a handicap value in the performing of a Bayesian filtering operating on a data set;

determining whether the utilized handicap value is a desired one to include in the plurality of error tolerance levels; and until a desired number of handicap values have been identified to include in the plurality, adjusting the handicap value and repeating the utilizing and determining steps with the adjusted handicap value.

13. The computer program product of claim 11 wherein the program code for associating each calculated handicap value with a corresponding error tolerance level further comprises program code for:

for each calculated handicap value of the plurality, associating a corresponding user selectable error tolerance level, such that responsive to a user selecting that error tolerance level, the corresponding handicap value is utilized for Bayesian filtering.

14. The computer program product of claim 8 wherein the Bayesian filtering classifies the incoming email messages as belonging to a single category from a group of categories consisting of:

spam; and legitimate email.

15. A computer system, at least partially implemented in hardware, for utilizing multiple error tolerance levels during Bayesian filtering, the computer system comprising:

a user interface configured to provide a plurality of error tolerance levels having corresponding handicap values to at least one user of a Bayesian filtering context, the user interface further configured to receive an error tolerance level selection from the at least one user; and a memory and a Bayesian engine embedded in the memory, the Bayesian engine being configured to adjust a Bayesian score in accordance with the handicap value corresponding to the selected error tolerance level during Bayesian filtering and to categorize incoming e-mail messages using the adjusted Bayesian score.

16. The computer system of claim 15 wherein the user interface is further configured to perform at least one step from a group of steps consisting of:
- receiving input from a user operating a user interface indicating a choice of a desired error tolerance level from among the plurality of error tolerance levels;
- receiving command line input indicating a choice of a desired error tolerance level from among the plurality of error tolerance levels;
- reading a parameter in a configuration file indicating a choice of a desired error tolerance level from among the plurality of error tolerance levels; and
- reading an environment variable indicating a choice of a desired error tolerance level from among the plurality of error tolerance levels.

17. The computer system of claim 15 wherein the user interface is further configured perform at least one step from a group of steps consisting of:
- embedding the plurality of error tolerance levels and corresponding handicap values in a Bayesian filtering software package, and providing the Bayesian filtering software package to at least one user;
- embedding the plurality of error tolerance levels and corresponding handicap values in a software update, and providing the software update to at least one user; and
- displaying a user interface component to at least one user that prompts the at least one user to select a desired error tolerance level from among the plurality of error tolerance levels.

\* \* \* \* \*

UNITED STATES PATENT AND TRADEMARK OFFICE
CERTIFICATE OF CORRECTION

PATENT NO.       : 7,890,590 B1
APPLICATION NO.  : 11/863007
DATED            : February 15, 2011
INVENTOR(S)      : Shaun Cooley It is certified that error appears in the above-identified patent and that said Letters Patent is hereby corrected as shown below:

Col. 5, line 51, replace "tion from the at least one user; and" with "tion from the at least one user;"

Col. 8, line 2, replace "interface is further configured perform at least one step from" with "interface is further configured to perform at least one step from"

Signed and Sealed this
Nineteenth Day of April, 2011

David J. Kappos
*Director of the United States Patent and Trademark Office*